United States Patent [19]

Maier

[11] 3,951,841
[45] Apr. 20, 1976

[54] PHONOGRAPH RECORD CLEANING COMPOSITION

[75] Inventor: Bruce R. Maier, St. Louis, Mo.

[73] Assignee: Discwasher Inc., Columbia, Mo.

[22] Filed: Nov. 6, 1974

[21] Appl. No.: 521,284

Related U.S. Application Data

[63] Continuation-in-part of Ser. No. 260,828, June 8, 1972, abandoned.

[52] U.S. Cl............................ 252/106; 15/104.94; 252/89 R; 252/91; 252/170; 252/DIG. 14
[51] Int. Cl.$^2$........................ C11D 1/72; C11D 3/48
[58] Field of Search ........... 252/106, 107, 170, 153; 424/26, 127, 226; 106/15 AF

[56] References Cited
UNITED STATES PATENTS

| | | | |
|---|---|---|---|
| 3,069,358 | 12/1962 | Blodinger | 252/107 |
| 3,069,359 | 12/1962 | Blodinger | 252/107 |
| 3,234,085 | 2/1966 | Renckhoff et al. | 424/226 |
| 3,342,740 | 9/1967 | Kazmierczak et al. | 252/153 |
| 3,639,293 | 2/1972 | Shema et al. | 252/180 |
| 3,761,429 | 9/1973 | Yamano et al. | 252/547 |

OTHER PUBLICATIONS
Chem. Absts. – Vol. 36:3214$^7$; Vol. 40:6553$^5$; Vol. 52:12079 f and Vol. 56:4291 h.

*Primary Examiner*—P. E. Willis, Jr.
*Attorney, Agent, or Firm*—Paul M. Denk

[57] ABSTRACT

A cleaning composition of high chemical activity with anti-fungal properties, and with low dry weight residue and particularly useful for cleaning the surface of phonograph records; the mixture includes a surfactant, an emulsifier, an anti-microbe or fungicide, all intermixed in a liquid carrier such as water. This composition is most effective when used in combination with a brush designed having a cloth cover whose projecting filament form a pile that is finished and maintained angularly, and which when brushed against this pile effectively loosens dirt particles from the phonograph record surfaces being treated. In the method of use of this invention, the cleaning composition may be applied to the leading edge of said brush pile, with the brush then being moved simultaneously across and with a rolling action upon the surface being cleaned, as for example, the phonograph record surfaces, thereby effectively cleaning the disc of lipids, dust particles, and fungal particles that may clog and/or be germinating in the microgrooves of the same.

2 Claims, 3 Drawing Figures

U.S. Patent   April 20, 1976   3,951,841
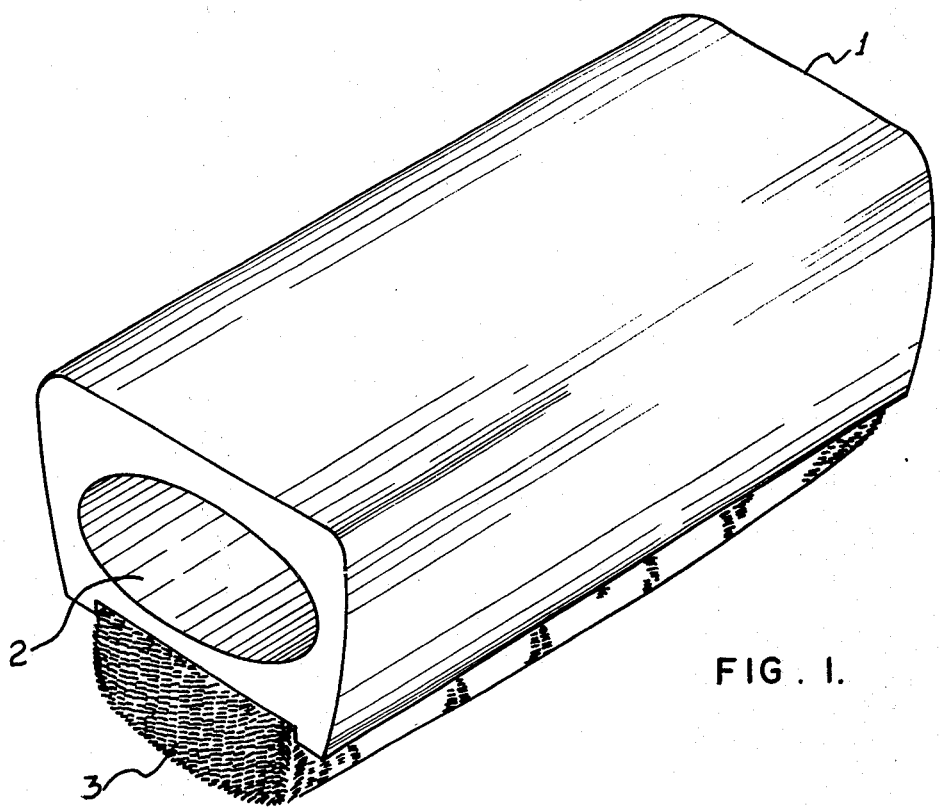
FIG. 1.
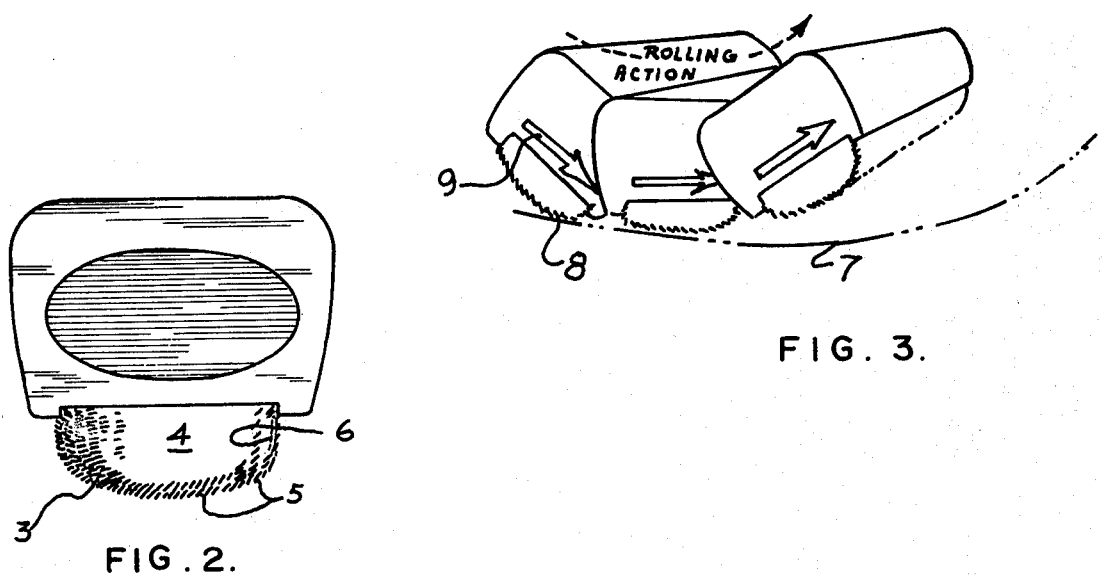
FIG. 2.
FIG. 3.

PHONOGRAPH RECORD CLEANING COMPOSITION

CROSS REFERENCE TO RELATED APPLICATION

This application is related to and comprises a continuation-in-part of the application having Ser. No. 260,828, and filed on June 8, 1972 and now abandoned; priority being herein claimed with respect to said earlier application.

BACKGROUND OF THE INVENTION

This invention relates principally to a cleaning fluid that may effectively loosen fungi growths from upon a phonograph record surface, coagulates them by emulsification, and then removes said particles through cooperation of a specially designed slanted pile brush.

Experimentation has shown the humidity plus organic contamination upon a surface, as for example, the vinyl and plastic surface of a phonograph record, does serve as a life-support system for microorganisms, in addition to adhering the usual dirt particles. Such microbes, especially fungi, produce enzymes in an environment that can render them active enough to be so destructive as to actually etch a glass surface, much less the plastic surface of a phonograph record. When this activity occurs upon a phonograph record, since such contemporary records are usually formed of a vinyl resin, they may more easily induce an irreversible damage to the record surface and impair substantially the quality and tone of its recording, in addition to physically blocking the encoded subsurfaces of the record.

Other types of cleaning fluids presently available and in common use usually do not take into consideration the microbial additions usually accumulated upon material surfaces, and in particular the subsurfaces, and in addition, they usually only contain fluid ingredients such as wetting agents and alcohols, principally to provide for a wet of the surface, with then a dissolving of the dirt particles thereon. In use, most of these prior fluids, while being somewhat effective, usually fail with convenient application to totally loosen all of the dirt particles deposited upon the surface to be cleaned, and in particular, any fungal contamination living thereon, and therefore, have a tendency to leave some residum dirt remaining upon the surface even after a thorough cleaning. Hence, prior cleaning fluids have a tendency to simply rearrange the residue dust and dirt particles on the surface being cleaned, rather than lift all of the same from the surface for a total cleansing as judged by microscopic examination.

More particularly, prior cleaning compositions usually contain ingredients to specific quantities that while providing ample proportions of cleaning agents that may satisfactorily clean durable surfaces, such as presented on metal, glass, or ceramic surfaces, such ingredients are generally too caustic to be utilized upon plastic surfaces, and in particular the delicate vinyl resin surfaces of a phonograph record, and in addition, such prior art cleaning compositions are also equally too caustic to be utilized freely for personal use cleaning, such as in the manner of domestic cleaning of phonograph records by the owner, which is almost always performed without any gloves or other forms of protective skin covering. For example, the prior art United States patent to Shema, No. 3,639,293, a slime control composition is disclosed, and which contains an ingredient for inhibiting the growth of slime in water, mainly for use in industrial purposes, with the particular type of slime being treated usually within the category of a bacterial species or its exrement that can soil or clog a surface. The cleaning ingredient includes a bactericide having biocidal activity, being used to eradicate bacterial growths, and is not necessarily used for treating the type of growths that exists upon the delicate resin surface that is presented upon a phonograph record. In addition, the present invention is designed to act as a fungicide, for use in eradicating fungi, as distinct from bacterial growths, upon and within the delicate encoded grooves of a phonograph record without occluding them with the cleaning agent. And furthermore, the quantity and type of bactericide suggested in this prior art patent is of the type that will leave a significant quantity of dry weight residue upon a surface, such as a record surface, in the event that Shema could even be utilized for such microsurfaces, then such residue of Shema's composition is totally detrimental to the continued usage of the phonograph record, generating an abrasiveness effect, which can lead to an early destruction of its fidelity. In addition, the residue of prior art formulations will generally occlude the encoded grooves of phonograph discs so as to eliminate accurate, full frequency, and undistorted playback from the same.

In view of the foregoing, it can be stated that previous formulations for micro-surface cleaners have generally ignored the problem of microbial degradation, which provides the base support for formation of damage to a phonograph record surface, or its subsurface, as presented through its cut grooves facing, and in addition, provides a remaining and residue like oily film which promptly attracts and accumulates other dust and dirt particles immediately even though the surface may have just been cleaned. And, as previously stated, once this oily film dries it provides a powdery residue which is too abrasive to the encoded record surface during subsequent performances. Many of these prior art cleaning fluids contain principally surfactants, such as glycerols and glycols alone, which have a tendency to act as intermediates which may even provide the life support for growth of organisms, such as fungi. Many of these compounds are growth stimulatory to bacteria and fungi, and directly contribute to the sustained life of such organisms particularly in these hard to clean micro-grooved subsurfaces of phonograph records. And, the known prior art cleaners contain un-linked alcohols and/or aldehydes that usually react with the plasticizer and/or stabilizer molecules of the resin formulations as are present in phonograph records, rendering them undesirably more brittle in structure after treatment. In addition to the foregoing, the instrumentalities that have heretofore been employed for cleaning surfaces of the described nature are usually just cloth like in appearance, and provide little or no assistance to loosening the tightly adhering dirt particles, much less the fungal organisms, and usually just shift the dust and dirt to another location upon the surface for its adherence thereon. In most instances, commercial cleaning fluids simply advise the user to apply any soft cloth in conjunction with its accompanying fluid.

It is, therefore, the principal object of this invention to provide a fluid cleaning composition which includes not only a surfactant for enhancing wetting of the surface to be cleaned, but in addition, contains a fungicidal ingredient, and an emulsifier, so as to both loosen any organisms and provide for their accumulation and ease of removal.

Another object of this invention is to provide a cleaning composition that decontaminates, and subsequently sustains the decontamination, of the surface being cleaned by removing lipid and surface organic contamination from the surface of interest.

In addition to the foregoing, another object of this invention is the provision of a novel angularly finished pile brush which both facilitates the loosening of dirt particles from a surface, or subsurface, in addition to providing the means for retention of the loosened dirt, and its effective removal.

It is a further object of this invention to provide a cleaning fluid formulation which removes dirt particles and organisms which have a tendency to etch and deteriorate delicate plastic surfaces.

Another object of this invention is to provide a combination of surfactant, emulsifier, fungicide, and liquid carrier at low levels that make them harmless to the human touch during personal usage, and which also exhibits a relatively very low dry weight residue unprecedented in the prior art such that after the evaporation of the liquid carrier there is no impedence to the fine fidelity desired from a phonograph record during performance, nor is left any abrasive like dry or dust particles that are detrimental to sustained fidelity.

Other objects will become more apparent to those skilled in the art in the light of the following summary, description, and accompanying drawing.

SUMMARY OF THE INVENTION

It might be stated that the present invention provides a system that uniquely combines chemistry, microbiology, and fabric design to provide effective cleaning of a phonograph record surface, its subsurface, or microgrooved surfaces. As previously described, the system consists of two components which cooperate together, namely, the unique fluid, and a specially designed brush which also serves as a storage unit for the fluid container. While the system has been found effective in cleaning a variety of material surfaces, or subsurfaces, its most effective usage and suggested application is specially for cleaning the delicately grooved surface of the vinyl phonograph record.

The fluid formulation may be generalized as follows:

1. A fungicide, such as sodium azide, at unprecedented low levels to attack ubiquitous fungi on the phonograph record surface;
2. An emulsifier, essential for cleaning, particularly for accumulating the particulate surface contamination;
3. A surfactant useful for wetting the surface to provide for fuller action of the foregoing ingredients;
4. An alcohol for rendering the surfactant of normally low aqueous soluability more soluable in the liquid carrier, and to enhance the lipid cleaning attributes of the composition; and
5. A liquid carrier, such as water, preferably distilled water, to provide the vehicle for supporting the cleaning ingredients.

The fluid composition is exclusively formulated to inhibit the growth of microorganisms, particularly fungi, to solubilize destructive and groove-blocking fatty oils and lipids (such as found on all human fingers), such as have lipolytic activity, and to reduce the effective static potential of the record surface by providing an electron conductive period during application of the fluid.

The brush of this invention is made of a developed fabric having a very fine, slanted and angularly oriented pile of sufficiently small fiber dimension to reach the bottom of the record grooves. The brush picks up and holds dirt when brushed against its angulated fibers, and the brush also soaks up, as in a form of capillary attraction, the fluid and the dirt mollified by the fluid. And, the angulated pile of this brush is designed to provide for release of its accumulated surface dirt and dust when brushed in an opposite direction on any other fabric surface.

The brush is designed having a frame member to which the pile cloth and intermediate cushioning is affixed, and a cavity is formed in the frame member of the brush to provide a storage location for the container holding the cleaning fluid of this invention.

The fluid of this system comprises a clear, aqueous solution for cleaning the type of surfaces as previously identified. The fluid contains, as previously summarized, as ingredients the various agents that function in the nature of a surfactant, a fungi antagonist, an emulsifier for accumulation of dirt, an alcohol for increased lipolysis and making the surfactant more soluable in the liquid carrier of water, and, in addition, may include a lubricant, which facilitates the efficient use of the cleaned surface, such as the cut side of a phonograph record.

In particular, the fungicide of this invention includes, preferably, sodium azide, although other fungicides may also be somewhat effective. Preferably, the fungicide is utilized in very small amounts within the composition, enough to provide fungicidal activity, but without being used to that amount which renders it damaging to human touch, caustic to the treated phonograph record surface, or at an amount that when evaporated and dried leaves a dry weight residue which can equally be damaging to the record surface. It may be herein commented that sodium azide ($NaN_3$) has frequently been utilized in photographic emulsions, generally to prohibit slime and microbial growths within the developer composition, but is generally included in an amount that can be detrimental to human touch, and certainly can leave substantial dry weight residue, which cannot be tolerated during usage of the composition of this present invention. In photographic developing the film is subjected to many rinsings to eliminate any residue, a luxury that cannot be afforded when cleaning records. Chemical Abstracts, Volume 56, page 2491h suggests this type of application. In addition, Chemical Abstracts, Volume 52, page 12079f suggests the use of sodium azide for its bacteriostatic or fungistatic action in a liquid medium for inhibiting bacteria and fungi growths. Such prior art, including Shema, does not take into consideration the need for combined lower surface tension, and lypolytic activity, in the cleansing of phonograph records. The present invention, though, takes into consideration the treatment of delicate surfaces of a phonograph record, which needs additional components in combination with a very low level fungicide to make up a proper solution of the composition for usage, and a surfactant and an emulsifier for providing its most effective usage in cleaning other forms of contamination, particularly, from phonograph record surfaces, with resultant extremely low dry weight residue.

A typical formulation for the fluid may comprise as follows:

| INGREDIENT | PERCENTAGE BY WEIGHT |
| --- | --- |
| Anti-microbe | up to 1 |
| Emulsifier | up to 1 |
| Surfactant | up to 1 |
| Liquid Carrier | at least 97 |

Another formulation for the fluid composition of this invention may be as follows:

| INGREDIENT | PERCENTAGE BY WEIGHT |
| --- | --- |
| Azide | up to 0.3 |
| Surfactant | between .005–.2 |
| Propylene Glycol | between .075 and .2 |
| Alcohol | between 0.01 and 5 |
| Water | remaining percent |

Another more specific formulation, and the one which has found effective commercial usage may be defined as follows:

| INGREDIENT | PERCENTAGE BY WEIGHT |
| --- | --- |
| Sodium Azide | .004 |
| Propylene Glycol | .005 |
| Surfactant | .075 |
| Distilled Water | 99.916 |
| | 100.00 |

Another formulation utilized:

| INGREDIENT | PERCENTAGE BY WEIGHT |
| --- | --- |
| Sodium Azide | up to .001 |
| Emulsifier | up to .0125 |
| Surfactant | up to .025 |
| Alcohol | up to 5.0 |
| Water | at least 94.9615 |

Another formulation presenting the range of the preferred ingredients is as follows:

| INGREDIENT | PERCENTAGE BY WEIGHT |
| --- | --- |
| Sodium Azide | .0001 to .001 |
| Surfactant | .0003 to .025 |
| Propylene Glycol | .001 to .0125 |
| Alcohol | .01 to 5 |
| Distilled Water | at least 94 |

The antimicrobial ingredient of the foregoing compositions has been found most effective when sodium azide is utilized, but other ingredients such as hexachlorophene, may be utilized, although it may be somewhat detrimental to the human through contact. Preferably the fungicide will have a molecular weight of less than 200.

The surfactant, or wetting agent, utilized in this composition may be any of the variety of surfactants available commercially upon the market, such as Tween 80 and Span, generally comprising nonionic surface active agents, but the surfactants that have been found most useful in this composition are octyl phenoxy polyethoxy ethanol and nonyl phenoxy polyethoxy ethanol (both nonionic), and such may be acquired from the Rohm and Haas Company of Philadelphia Pennsylvania, and which are sold, respectively, under the trademarks Triton X-114 and Triton N-57. The emulsifiers, as identified in the foregoing formulations, which also act as a lubricant to the record cleaning surface, and which have been found effective in this composition are propylene glycol, ethylene glycol, glycerine or glycerol, or any polyalcohol of this category. In addition, an alcohol, and more preferably, one being a short chained alcohol having the aliphatic carbon chain of up to 4 carbon atoms either lineally or branched within the compound may be used up to approximately five percent of the composition by weight, and is added to the composition for cleaning purposes, as a partial carrier, but more preferably as an agent to make the non or low water soluable surfactants, as identified above, more soluable in dilute concentrations in a liquid carrier such as water or distilled water. Any short chain alcohol such as ethyl, methyl, propyl, or isopropyl, may be effectively utilized for this purpose, and preferably is utilized at less than one percent in the solution.

When a surface is contacted by one of the cleaning fluids set forth above, the fluid has a tendency to exhibit fungicidal activity, to cause an emollienting of particulate matter on the surface, and then soluabilization with subsequent emulsification of the various particulate, lipid, and biological components into the formation of micelles, with a resulting enhancement of the cleansing ability of the applied fluid. It may be stated that the ingredients of this composition, particularly the azide and the glycol, when added to the surfactant, decomposes the surface attachment of the fungi, and poises the agglomeration to that critical micelle concentration that most effectively aggregates the lipids for ease of their removal. Then, through the use of the brush of this invention, these aggregated and emulsified dirt components may be easily removed from the soiled surface. And more importantly, even after this process is achieved, any remaining cleaning composition in the form of a residue that remains upon the surface of the phonographic record acts as a lubricant, and even when it should dry, it leaves little or no noticeable or actionable dry weight residue that may cause irritation to the record playing surface during its movement and contact with the phonographic needle.

It has also been found, through testing, that the fluid composition of this invention has little or no chemical effect upon surfaces such as vinyl, and therefore, does not damage the finely cut grooves of phonograph records. Furthermore, the low dry weight residue of the composition, as previously explained and summarized, epitomizes the playing grooves of the record at their most optimum fidelity since little or no residue is left after record treatment with this cleaning solution. For example, the preferred formulation has been calculated to contain as little as 0.0004 grams per c.c. of dry components in a fluid treatment, and after cleaning a record through use of the brush, leaves as little as 0.00015 grams per c.c. of dry weight residue on the record surface. In as much as less than 0.1 c.c. of liquid is generally administered for each cleaning operation, the resultant residue is so negligible, that it is not noticeable, it is undetectable, and foremost does not leave an abrasive film that is located intermediate the phonograph needle and the record surface.

BRIEF DESCRIPTION OF THE DRAWING

In the drawing, FIG. 1 discloses a perspective view of the cleaning brush of this invention;

FIG. 2 discloses a view of one end of the brush of FIG. 1; and

FIG. 3 discloses an illustration of the proper usage of the brush of this invention.

DESCRIPTION OF THE PREFERRED EMBODIMENT

In FIG. 1 of the drawing, there is disclosed the cleaning brush of this invention comprising a frame member 1, which is designed having curvature to allow for its convenient grasping by the hand as during usage of the same. Provided through one end of this frame member is a cavity 2 which is milled substantially inwardly, but not through, the body portion of the frame member 1, and is designed and having that size to accommodate a container of slightly less dimensions, and in which the cleaning composition of this invention is packaged. In the preferred form, the cavity 2 will extend perhaps three-fourths of the way through the frame member 1, but not all the way through the same.

As also viewed in FIG. 2, the bottom portion of the frame member 1 has a cloth means 3 mounted thereon, and to provide some softening of the cloth with respect to its mounting upon the frame member there is provided, intermediate thereof, and being covered entirely by the cloth, a cushioning means 4 which may be formed of expanded urethane, or other foam or cushioning filler. It is to be noted that the pile of the cloth 3 has its fibers 5 projecting angularly from the surface of the cloth from which they extend, and the orientation of these fibers has been found useful in facilitating the cleaning operation of surfaces, and particularly those surfaces formed having grooves therein. Desirably, and to add to the absorptive characteristics of the cloth 3, the inner side of the cloth, which would be at a location as shown along hidden line 6, if FIG. 2 was a cross sectional view of the brush, is un-backed, or lacking of projecting fibers or pile, and in this manner adds to the absorptive characteristics of the cloth and sponge portion of the brush.

The most effective way in which this brush can be used in illustrated in FIG. 3. For example, the outline provided at 7 may be the peripherial edge of a surface, as for example, a phonograph record, and the brush 1 may be applied for cleaning said surface as follows. An application of the fluid of this invention should be applied to the leading edge of the brush cloth, and in application, the fluid as applied to this edge of the brush probably should be sufficient to dampen the fabric at this location. Then, the damp leading edge of the brush, the leading edge shown at 8, and which is pointed out by the direction of the arrow 9, should be applied to the rotating surface, and since the pile of the fabric is angularly pointing towards this leading edge, dust and debris upon the surface of the record will be picked up and absorbed into the fine pile of said brush.

Likewise, the cleaning composition of this invention, which has been applied to this leading edge of the brush, will be simultaneously solubilizing any dirt compounds and microbes that are on the record surface. Then, the brush should be slowly rocked periodically so that alternately the surface will be moistened by the cleaning composition, and just thereafter the dry rear portion of the pile will contact the surface, which in this case is revolving, and pick up the loosened and softened dirt. Continued contact of the dry back portion of the brush upon the surface will eventually assist in drying of the now cleansed surface.

It should now be quite obvious that during this cleaning function, the angularly oriented fibers or pile of the brush are quite effective in extending against their grain into the microgrooves of any surface such as that provided on a phonograph record, and since this pile is angled against the movement of the brush and the revolving surface, there is a tendency for this pile to forcefully project into these grooves and dislodge softened contamination.

Numerous variations in the formulation of the cleaning fluid of this invention, or the construction of its brush, all within the scope of the appended claims, will occur to those skilled in the art in the light of the foregoing disclosure. The describedd embodiments and formulations are merely illustrative.

Having thus described the invention what is claimed and desired to be secured by letters patent is:

1. A phonograph record cleaning composition useful for loosening and coagulating particulate matter and inducing fungicidal activity upon the record surface without leaving any evident dry weight residue after usage, and consisting essentially of a fungicide of sodium azide in an amount of between about 0.0001 to 0.001 percent by weight, a nonionic surfactant selected from the group consisting of octyl phenoxy polyethoxy ethanol and nonyl phenoxy polyethoxy ethanol and included in an amount of between about 0.0003 to 0.025 percent by weight, and emulsifier selected from the group consisting of propylene glycol, ethylene glycol, and glycerine and included in an amount of between about 0.001 to 0.0125 percent by weight, an alcohol selected from the group consisting of methyl, ethyl, propyl and isopropyl alcohols and included in an amount of between about 0.01 to 5 percent, and the remaining part of the composition comprising a liquid carrier of water present in an amount of not less than 94 percent by weight, said alcohol being included to make the surfactant more soluable in said water.

2. The invention of claim 1 wherein the water is distilled water.

* * * * *